US012675470B2

(12) United States Patent
Tishbi et al.

(10) Patent No.: US 12,675,470 B2
(45) Date of Patent: Jul. 7, 2026

(54) TECHNIQUES FOR GENERATING NATURAL LANGUAGE CONTEXT IN AN ISSUE TRACKING SYSTEM

(71) Applicant: Avalor Technologies Ltd., San Jose, CA (US)

(72) Inventors: Kfir Aharon Tishbi, Herzliya (IL); Raanan Raz, Tel Aviv (IL)

(73) Assignees: Avalor Technologies Ltd., Ramat Gan (IL); Zscaler, Inc., San Jose, CA (US)

( * ) Notice: Subject to any disclaimer, the term of this patent is extended or adjusted under 35 U.S.C. 154(b) by 0 days.

(21) Appl. No.: 18/672,444

(22) Filed: May 23, 2024

(65) Prior Publication Data

US 2025/0363099 A1 Nov. 27, 2025

(51) Int. Cl.
*G06F 16/242* (2019.01)
*G06F 16/2452* (2019.01)
*H04L 9/40* (2022.01)

(52) U.S. Cl.
CPC ...... *G06F 16/243* (2019.01); *G06F 16/24522* (2019.01); *H04L 63/1416* (2013.01)

(58) Field of Classification Search
CPC ............. G06F 16/243; G06F 16/24522; H04L 63/1416
See application file for complete search history.

(56) References Cited

U.S. PATENT DOCUMENTS

| | | | |
|---|---|---|---|
| 10,395,271 B2 | 8/2019 | Kassko et al. | |
| 10,754,877 B2 | 8/2020 | Kassko et al. | |
| 11,783,515 B2 | 10/2023 | Sheffer et al. | |
| 12,001,550 B1 * | 6/2024 | Schindel | G06F 21/554 |
| 12,056,003 B1 * | 8/2024 | Ramos | G06F 11/0793 |
| 12,105,746 B1 * | 10/2024 | Wu | G06F 16/3329 |
| 2017/0330106 A1 * | 11/2017 | Lindsley | G06N 5/043 |
| 2020/0259728 A1 | 8/2020 | Oren et al. | |
| 2025/0131023 A1 * | 4/2025 | Shim | G06F 16/3344 |
| 2025/0173607 A1 * | 5/2025 | Talwalkar | G06N 20/00 |
| 2025/0252095 A1 * | 8/2025 | Lichtenstein | G06F 16/2428 |

OTHER PUBLICATIONS

Rahman MM, Watanobe Y. ChatGPT for Education and Research: Opportunities, Threats, and Strategies. Applied Sciences. 2023; 13(9):5783. https://doi.org/10.3390/app13095783 (Year: 2023).*

* cited by examiner

*Primary Examiner* — Matthew J Ellis
(74) *Attorney, Agent, or Firm* — Baratta Law PLLC; Lawrence A. Baratta, Jr.

(57) ABSTRACT

Generating a natural language context from a ticket management system includes receiving an unstructured natural language query from a client device; generating a first prompt for a first large language model (LLM) based on: a predefined template and the unstructured natural language query, the first prompt when processed by the first LLM outputs a structured database query; executing the structured database query on a database, the database including a representation of a cloud computing environment; generating a second prompt for a second LLM based on a result of executing the structured database query, the second prompt when processed by the second LLM outputs a natural language response; and sending the natural language response to the client device.

20 Claims, 6 Drawing Sheets

TECHNIQUES FOR GENERATING NATURAL LANGUAGE CONTEXT IN AN ISSUE TRACKING SYSTEM

TECHNICAL FIELD

The present disclosure relates generally to cybersecurity, and specifically to a system and method for management of cybersecurity vulnerability alerts and ticketing systems utilizing a large language model (LLM).

BACKGROUND

Computing environments increasingly govern critical infrastructure, such as banking systems, power production, gas delivery, traffic management systems, aviation management systems, health systems, and many others. As such, these environments are ripe targets for cybersecurity attacks. Hackers are increasingly incentivized to gain access to such systems, whether they are on-prem (i.e., on-premises), utilize a cloud-based computing environment, a hybrid model, and the like.

Many solutions exist to combat cybersecurity threats, such as vulnerabilities, misconfigurations, exposures, malware, and the like. Some solutions focus on external attack surface management (EASM), which look at computing environments through the eyes of a hacker (ergo, external), while other solutions take a more defensive approach to limit access to computing environments, such as implementing zero trust network solutions. In cloud computing environments, workloads such as virtual machines can be scanned to detect cybersecurity threats.

These various solutions generate alerts and provide these alerts to ticketing systems for management and tracking purposes. For example, Jira® is a ticketing system which can receive alerts from various cybersecurity solutions, and generate a ticket based on the received alerts. A ticket can be assigned to an engineer who will then look into the issue corresponding to the ticket, in an attempt to solve it.

Challenges begin to arise as computing environments are increasingly large, and cybersecurity threats are shifting, increasingly sophisticated, priorities change, and all this is exacerbated by the fact that some events may present a critical cybersecurity threat in a first context, but the same event in a different context is not considered a cybersecurity threat at all.

The growing number of alerts has led to what is known as "alert fatigue". This is a phenomenon where exposure to large number of often recurring and repeating alerts causes longer response times, missing truly critical alerts, misunderstanding alerts, and the inability to effectively manage and address cybersecurity issues simply by being overwhelmed by the number of alerts. It is not unusual for such system to generate hundreds of thousands of alerts for a given computing environment.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for cybersecurity vulnerability management through ticket system reduction. The method comprises: receiving a plurality of alerts from a cybersecurity monitoring system, the cybersecurity monitoring system configured to monitor a computing environment, wherein each alert includes a plurality of attributes; generating in a graph database a ticket node corresponding to each alert of the received plurality of alerts; generating in the graph database a ticket group node, the ticket group node connected to a plurality of ticket nodes, each ticket node of the plurality of ticket nodes corresponding to an alert having an attribute with a same value; generating a ticket in a ticketing system corresponding to the ticket group node; and generating a visual representation of the ticket corresponding to the ticket group node.

Certain embodiments disclosed herein also include a non-transitory computer readable medium having stored thereon causing a processing circuitry to execute a process, the process comprising: receiving a plurality of alerts from a cybersecurity monitoring system, the cybersecurity monitoring system configured to monitor a computing environment, wherein each alert includes a plurality of attributes; generating in a graph database a ticket node corresponding to each alert of the received plurality of alerts; generating in the graph database a ticket group node, the ticket group node connected to a plurality of ticket nodes, each ticket node of the plurality of ticket nodes corresponding to an alert having an attribute with a same value; generating a ticket in a ticketing system corresponding to the ticket group node; and generating a visual representation of the ticket corresponding to the ticket group node.

Certain embodiments disclosed herein also include a system for cybersecurity vulnerability management through ticket system reduction. The system comprises: a processing circuitry; and a memory, the memory containing instructions that, when executed by the processing circuitry, configure the system to: receive a plurality of alerts from a cybersecurity monitoring system, the cybersecurity monitoring system configured to monitor a computing environment, wherein each alert includes a plurality of attributes; generate in a graph database a ticket node corresponding to each alert of the received plurality of alerts; generate in the graph database a ticket group node, the ticket group node connected to a plurality of ticket nodes, each ticket node of the plurality of ticket nodes corresponding to an alert having an attribute with a same value; generate a ticket in a ticketing system corresponding to the ticket group node; and generate a visual representation of the ticket corresponding to the ticket group node.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
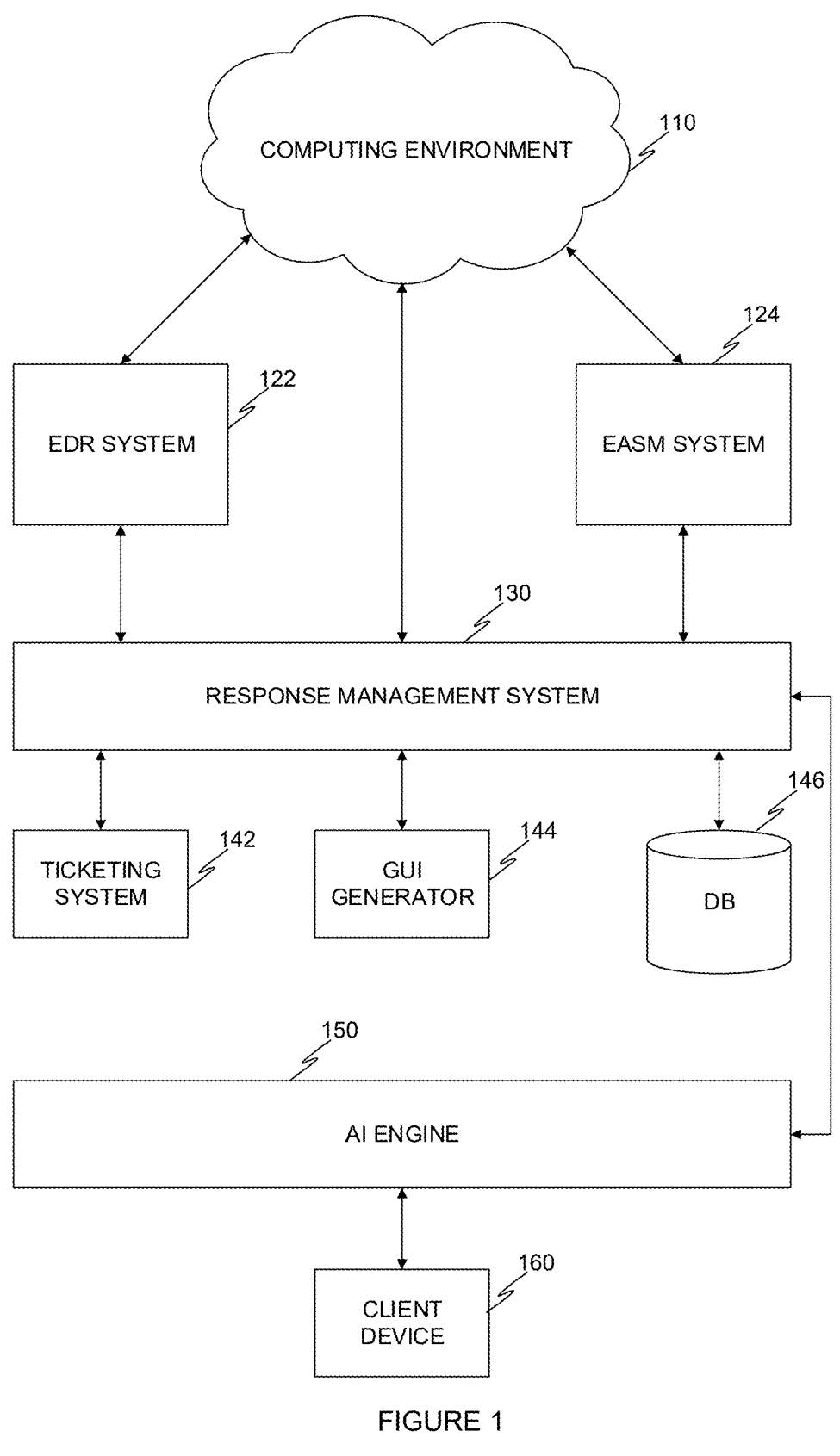
FIG. 1 is a network diagram of a response management system, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for managing cybersecurity vulnerabilities through support ticketing systems. In order to reduce alert fatigue, and ensure that redundant tickets are not generated, a system is configured to receive alerts from a plurality of cybersecurity monitoring solutions. In an embodiment, a cybersecurity monitoring solution includes a scanner, which is configured to scan for misconfigurations, exposures, vulnerabilities, weak passwords, exposed passwords, sensitive data, and the like.

The system is configured, in an embodiment, to generate tickets in a ticket support system, based on the received alerts. In certain embodiments, alerts are grouped, clustered, and the like, for example based on attributes detected in an alert. In some embodiments, alerts are grouped based on an identifier of the alert. In certain embodiments, a group ticket is generated, which represents a plurality of alerts. In an embodiment, the plurality of alerts pertains to a single machine, and a group ticket is generated to represent all the alerts of a specific machine. In other embodiments, the plurality of alerts are generated based on the same cybersecurity issue across different machines, and the group ticket is generated to represent the cybersecurity issue.

In an embodiment, the system is configured to reduce an amount of tickets displayed by a ticketing system by generating a ticket group which represents a plurality of tickets, alerts, and the like. Reducing the amount of tickets displayed in a ticketing system allows to reduce alert fatigue and mitigate cybersecurity issues which are associated with an alert for which a ticket is generated. Furthermore, reducing the amount of tickets display, i.e., by instead displaying a ticket group, allows a reduction in rendering which allows saving power used by a processing circuitry configured to perform the rendering.

In this regard, it is recognized that a human can manually generate a ticket in a ticketing system. However, when generating a ticket which represents a plurality of tickets, alerts, and the like, a human applies subjective criteria to determine which alerts, tickets, and the like, should be grouped together. Furthermore, different humans may apply different subjective criteria, resulting in even more disparity of grouping results. The disclosed system solves this, in an embodiment, by at least applying predefined objective criteria, thus generating reliably consistent ticket groups based on a plurality of tickets, alerts, and the like.

It has further been recognized that a human cannot manually generate such a plurality of tickets, which in certain embodiments are numbered in thousands, tens of thousands, hundreds of thousands, and the like. For example, a plurality of alerts are generated in response to detecting that an application, such as Google® Chrome® is out of date on each of ten thousand endpoints connected to a network. An endpoint is, for example, a laptop computer, a desktop computer, a tablet, and the like. A human is physically incapable of generating a plurality of tickets, each corresponding to an alert, and generating a group ticket based on the plurality of tickets. Additionally, generating such a plurality of tickets must be performed within a timeframe which a human is incapable of doing, as every second is crucial when dealing with cybersecurity issues. While a human would be manually generating such tickets, a hacker may exploit a cybersecurity weakness, vulnerability, and the like, which is why speed is of the essence.

Furthermore, by generating a ticket group to visually represent a plurality of tickets, compute resources are reduced by at least not having to render the plurality of tickets, and rendering instead a visualization of a ticket group. In some embodiments, rendering for display a visualization of a ticket group in place of a visualization for each of a plurality of tickets which comprise the ticket group, is further realized as a reduction in memory usage, as there is no need to store in a memory data relating to each of the plurality of tickets. Thus, the data of each of the plurality of tickets can be stored in a storage, while data associated with the ticket group is stored in memory. This results in faster access of the data of the ticket group, as memory access is faster than storage access, in an embodiment.

FIG. 1 is an example of a network diagram 100 of a response management system, utilized to describe an embodiment. A computing environment 110 is communicatively coupled with a response management system 130. In an embodiment, the computing environment 110 is an on-prem (i.e., on-premises) computer network, a cloud computing environment, a hybrid cloud computing environment, and the like. A cloud computing environment may be, for example, utilized as a virtual private cloud (VPC) over Amazon® Web Services, a VNet on Microsoft® Azure, and the like.

The cloud computing environment 110 includes a plurality of resources. A resource is, in an embodiment, an endpoint, a computing device, a user device, a server, a virtual computing device, a virtual machine, a software container, a serverless function, an appliance, a managed image, a virtual disk, a storage bucket, a software application, and the like. In an embodiment, a resource includes a cybersecurity issue. A cybersecurity issue may be, for example, a misconfiguration, a vulnerability, an exposure, a malware, and the like.

In certain embodiments, the computing environment 110 is communicatively connected with an endpoint detection and response (EDR) system 122, and an external attack surface management (EASM) system 124. In an embodiment, the EDR system 122 is configured to detect cybersecurity threats on endpoints of the computing environment 110. An endpoint is a resource which connects the computing environment 110 to computers, networks, and the like, which are external to the computing environment 110. An endpoint may be, for example, a user device, a gateway, a server, and the like. In an embodiment, the EDR system 122 is further configured to generate an alert in response to detecting a cybersecurity issue.

In an embodiment, the EASM system 124 is configured to discover resources which are external facing of the computing environment 110. An external facing resource is a resource which is configured to communicate or otherwise interact with resources which are outside of the computing environment 110. An example of an external facing resource is a webserver, such as Nginx® deployed on a virtual machine inside the computing environment 110. The webserver provides connectivity between resources in the computing environment 110 to resources, client devices, third party applications, third party services, and the like, which are all external to the computing environment 110. In an embodiment, the EASM system 124 is configured to generate an alert in response to detecting a cybersecurity issue detected on an external facing resource.

In some embodiments, the EDR system 122 and EASM system 124 provide overlapping detection of cybersecurity issues. However, since the EDR system 122 and the EASM system 124 do not communicate with each other, each generates an alert for what is possibly the same security issue. If the EDR system 122 and the EASM system 124 are both connected to a ticketing system 142 (or ticket management system 142) each would generate an alert for the ticketing system 142. In an embodiment, the ticketing system 142 is configured to generate a ticket for each received alert. As noted above, generation of excessive tickets leads to alert fatigue, an outcome which it is desirable to avoid.

In an embodiment, a ticket is stored as a task, an event, similar data structure, and the like, and is assigned to a user account, a group of user accounts, and the like. A user account associated with a task (i.e., with a ticket) is responsible for performing mitigation of the cybersecurity issue which caused the ticket to be generated. In certain embodiments, a ticket is a data structure which includes an identifier of the cybersecurity issue, an identifier of a user account, and identifier of a user group, an identifier of a resource on which the cybersecurity issue was detected, and the like. For example, a CVE (Common Vulnerability and Exposure) database identifier is an identifier of a cybersecurity issue.

In certain embodiments, an alert includes an identifier of the cybersecurity issue, an identifier of the resource on which the cybersecurity issue was detected, a timestamp, additional details, and the like. For example, a cybersecurity issue may be detecting that a software version is out of date. The alert generated based on this detection includes, in an embodiment, an identifier of the software (e.g., Windows® XP) and the issue with the software (e.g., "out of date").

In an embodiment, the response management system 130 is connected to the EDR system 122 and the EASM system 124. While two cybersecurity monitoring solutions are presented in this example, it is evident that in other embodiments other cybersecurity monitoring solutions can be communicatively connected with the response management system 130 which receives alerts, events, data, combinations thereof, and the like, generated by such cybersecurity monitoring solutions. By providing tickets to the response management system 130 rather than directly to the ticketing system 142, the response management system 130 is able to preprocess alerts from the cybersecurity monitoring solutions and generate improved tickets, reducing the number of tickets by detecting duplications, and the like. Various methods for improving ticket management and generation are disclosed herein.

In an embodiment, an improved ticket is augmented with a context of the alert based on the customer environment, the organizational structure, and the like. For example, a ticket is augmented with information about a role, in response to determining that a plurality of alerts are generated from endpoints which are all utilized by user accounts having in common the role. Role information may be, for example, an identifier, a list of permission, privileges, and the like.

For example, in an embodiment the response management system 130 is configured to receive a first alert from a first cybersecurity monitoring system (e.g., EDR system 122) and a second alert from a second cybersecurity monitoring system (e.g., EASM system 124). In an embodiment, the response management system 130 is configured to determine that the first alert and the second alert are generated based on the same cybersecurity issue, which was detected by different systems. In certain embodiments, the response management system 130 is configured to generate a unified ticket based on the received first alert and second alert.

In some embodiments, determining that the first alert and the second alert indicate the same cybersecurity issue includes detecting an identifier of a resource in the first alert which matches an identifier of a resource in the second alert, and detecting in the first alert a cybersecurity issue identifier which matches a cybersecurity issue identifier detected in the second alert.

In certain embodiments, the response management system 130 is configured to determine a severity score for the generated ticket. In some embodiments the severity score is determined based on the received first alert and the second alert. For example, each alert is associated with a severity score, for example based on a determined policy. In some embodiments, the response management system 130 is configured to determine a ticket severity score based on the severity score of the received alerts.

In some embodiments, the response management system 130 is further connected to a graphical user interface (GUI) generator 144 and a graph database 146. In an embodiment, the GUI generator 144 is configured to generate for display a ticketing user interface, which, in an embodiment, is configured to receive a request from a user to generate a view of tickets associated with a particular user account, user group, and the like.

In certain embodiments, the response management system 130 is configured to generate a representation of alerts, tickets, and the like as nodes stored in a graph of the graph database 146. A graph database 146 is, in an embodiment, Neo4j®, for example. In some embodiments, the response management system 130 is configured to generate group nodes, which represent a group of nodes, each node representing an object. In an embodiment, an object is an asset (e.g., a workstation, a server, an endpoint, an application, resource, and the like), a source code repository (e.g., GitHub®, etc.), an identity and access management (IAM) system, an organizational chart, an alert, a ticket, and the like. For example, a group of tickets is represented by a group node, which is connected to a plurality of nodes, each node of the plurality of nodes representing a unique ticket of the group of tickets.

In an embodiment, the response management system 130 further includes a rule engine (not shown) having a plurality of rules. In certain embodiments, a rule of the plurality of rules is applied to an alert, and a ticket is generated based on the outcome of applying the rule to the alert. For example, in an embodiment a rule may be to group alerts based on a detected cybersecurity issue if the cybersecurity issue is detected on a resource having the same, or similar, attributes.

For example, a plurality of alerts are generated by a cybersecurity monitoring system, each alert pertaining to a different virtual machine deployed in a cloud computing environment based on the same base image, the alert indicating that the virtual machine includes a vulnerability such as CVE-2022-29255. When a rule is applied to the plurality of alerts, a single ticket is generated, indicating that a plurality of virtual machines deployed in the cloud computing environment all share a similar vulnerability. By displaying a single ticket rather than each of the plurality of alerts, the amount of displayed alerts is reduced, thus reducing alert fatigue and reducing resources utilized in rendering and displaying the plurality of alerts.

In an embodiment, the response management system 130 is communicatively connected to an artificial intelligence (AI) engine 150. In certain embodiments, the AI engine 150 is configured to receive natural language queries and generate a database query in a structured language for execution on a database.

In some embodiments, the structured query is executed on a database, such as the database 146. In an embodiment, the database 146 is configured to generate an output, a result, and the like.

In certain embodiments, the AI engine 150 is configured to receive the output, result, and the like, from the database 146, and generate a natural language response based on the same. In an embodiment, the AI engine 150 includes a large language model (LLM) utilized to generate the structured query, the natural language response, and the like.

According to an embodiment, the AI engine 150 is configured to generate a prompt for the LLM. In some embodiments, the AI engine 150 is configured to generate the prompt based on a template, a schema, a natural language query, a combination thereof, and the like. In certain embodiments, the AI engine 150 is configured to execute multiple LLMs. In an embodiment, a first LLM includes a first context length, and a second LLM includes a second context length which is different from the first context length.

Figure 2:
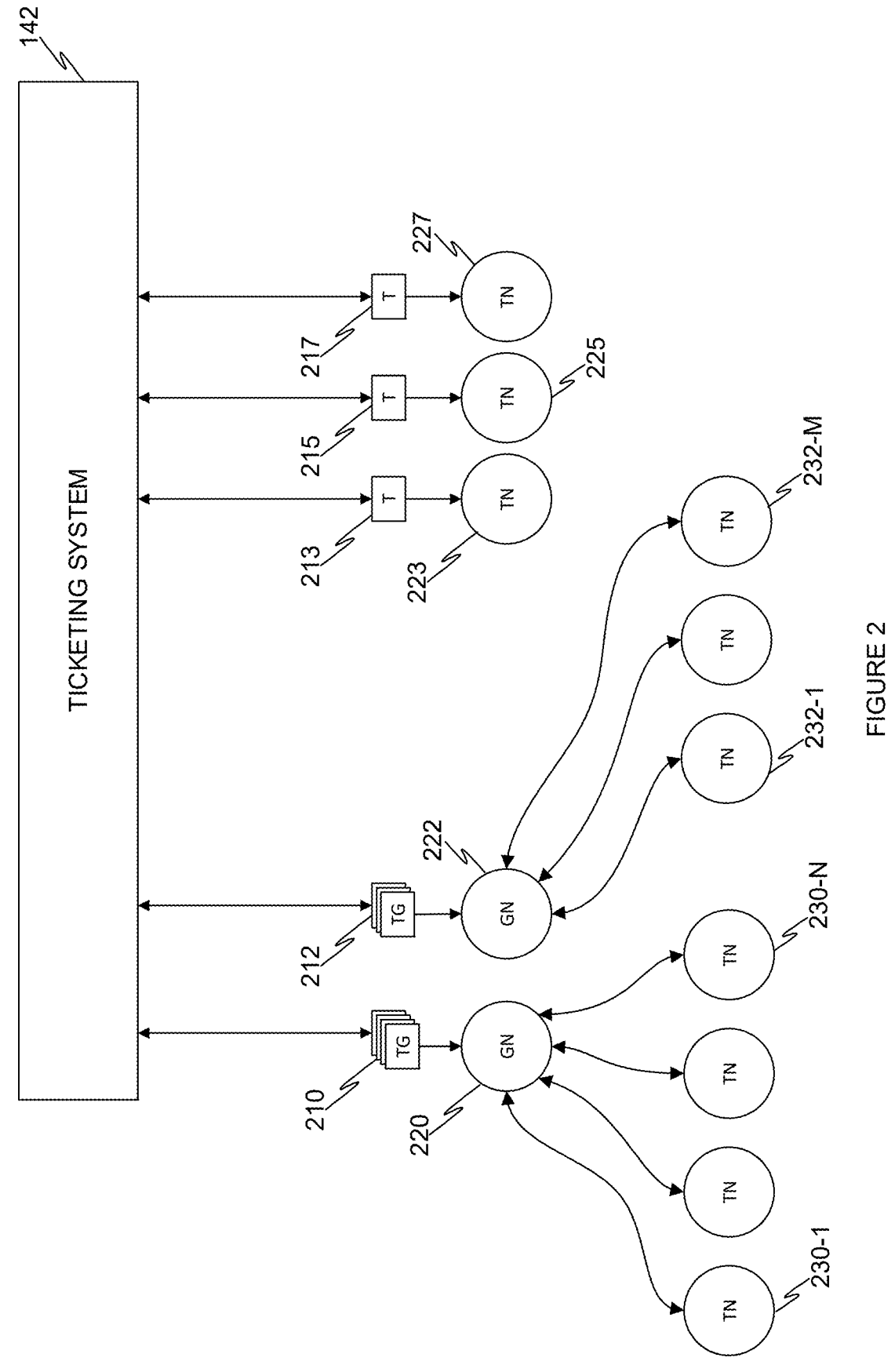
FIG. 2 is a diagram of a ticket management system generating support tickets and their representation on a graph database, utilized to describe an embodiment.

FIG. 2 is an example diagram of a ticket management system generating support tickets and their representation on a graph database, utilized to describe an embodiment. In an embodiment, a ticket management system 142 (or ticketing system 142) is, for example, Jira®, Redmine®, and the like.

A ticketing system 142 is configured, in an embodiment, to receive alerts from a plurality of cybersecurity monitoring solutions, and generate tickets based on the received alerts. In an embodiment, a cybersecurity monitoring solution is configured to provide a zero-trust network solution, endpoint protection, data loss prevention, network filtering, web content filtering, secure code, and the like. In certain embodiments, a cybersecurity monitoring solution is further configured to scan computers, virtual machines, software containers, serverless functions, and the like, to detect cybersecurity issues, such as malware, exposed passwords, weak passwords, misconfigurations, combinations thereof, and the like.

In an embodiment a cybersecurity monitoring solution is configured to generate an alert when a cybersecurity issue is detected. For example, when a scanner detects a malware object on a disk of a virtual machine, an alert is generated to indicate that the malware object was detected on the virtual machine. In an embodiment, the alert includes data identifying the resource on which the alert is generated, data identifying the detected cybersecurity issue (e.g., an identifier of the malware, hash signature of the malware, etc.), a timestamp, and the like.

In some embodiments the response management system 130 is configured to generate a new alert, generate an updated alert, update an existing alert, and the like.

In an embodiment, the ticketing system 142 is configured to generate tickets, such as first ticket 213, second ticket 215, and third ticket 217. The ticketing system 142 is further configured, in an embodiment, to generate ticket groups, such as first ticket group 210 and second ticket group 212. A ticket group is generated in an embodiment based on applying a rule to a group of tickets. For example, a rule states that if a group of tickets each include a cybersecurity vulnerability detected on a software container deployed in a first VPC of an AWS cloud computing environment, and the tickets differ only by the name of the software container, then a ticket group is generated for the group of tickets. In certain embodiments, a ticket group includes a flag, indicator, and the like, to distinguish between single tickets and ticket groups.

In certain embodiments, a ticket group, such as first ticket group 210 is represented in a graph as a group node 220. The group node 220 is connected to a plurality of ticket nodes 230-1 through 230-N, referred to singularly as ticket node 230 and generally as ticket nodes 230, where 'N' is an integer having a value of '2' or more. In an embodiment each ticket node 230 represents a unique ticket. In some embodiments, each ticket node 230 represents a unique alert.

In some embodiments, the group node 220 includes data which is common to each ticket of the group of tickets. By storing common data only in the ticket group node 220, and not the individual nodes, a compact representation is achieved, as duplicated data is not stored. For example, where a group of tickets 212 has a common vulnerability, an identifier of the common vulnerability is stored in the metadata of group node 222 which represents each ticket 232-1 through 232-M, where 'M' is an integer having a value of '2' or more. The identifier of the common vulnerability is not stored with each ticket node 232, thereby reducing the amount of storage required to store the ticket nodes 232.

In certain embodiments, a ticket node, ticket group node, and the like, include a tag which indicates if the corresponding node is part of a view. A view includes a group of nodes, a representation of which is visually rendered for display, for example by a GUI generator, such as the GUI generator 144 of FIG. 1 above. For example, a response management system is configured, in an embodiment, to receive a request to render a visualization showing all open tickets. An open ticket is a ticket for which the underlying issue which caused the generation of the ticket is still active. For example, if a cybersecurity threat was not addressed, for example, by updating a software version, the ticket remains in open status until the action to address it occurs. In certain embodiments a ticket node, such as first ticket node 223, includes a tag indicating a status of the ticket, for example that the ticket is an open ticket, a resolved ticket, and the like.

In some embodiments, the graph is traversed to detect ticket nodes, group nodes, and the like, which include a tag indicating the node should be displayed in a result, and a tag indicating that the node represents a ticket or group of tickets, which are in open status. In some embodiments, providing an interaction with a group node, such as first group node 220, initiates execution of an instruction which configures a GUI to render a visualization based on the ticket nodes 230 connected to the first group node 220. For example, in an embodiment, the interaction is a click received through a mouse, a touch received through a touch screen, and the like. Displaying initially a ticket group, and displaying an expansion of that ticket group is advantageous as it allows to initially present a reduced view (i.e., displaying a group ticket rather than all the tickets which comprise together the group), while still allowing a user to quickly expand the view to achieve greater depth of information (by viewing all the tickets which comprise an interacted-with ticket group). This reduces the initial amount of rendering required to be performed by a processing circuitry, as rendering a single ticket group requires less processing than rendering a plurality of tickets.

Figure 3:
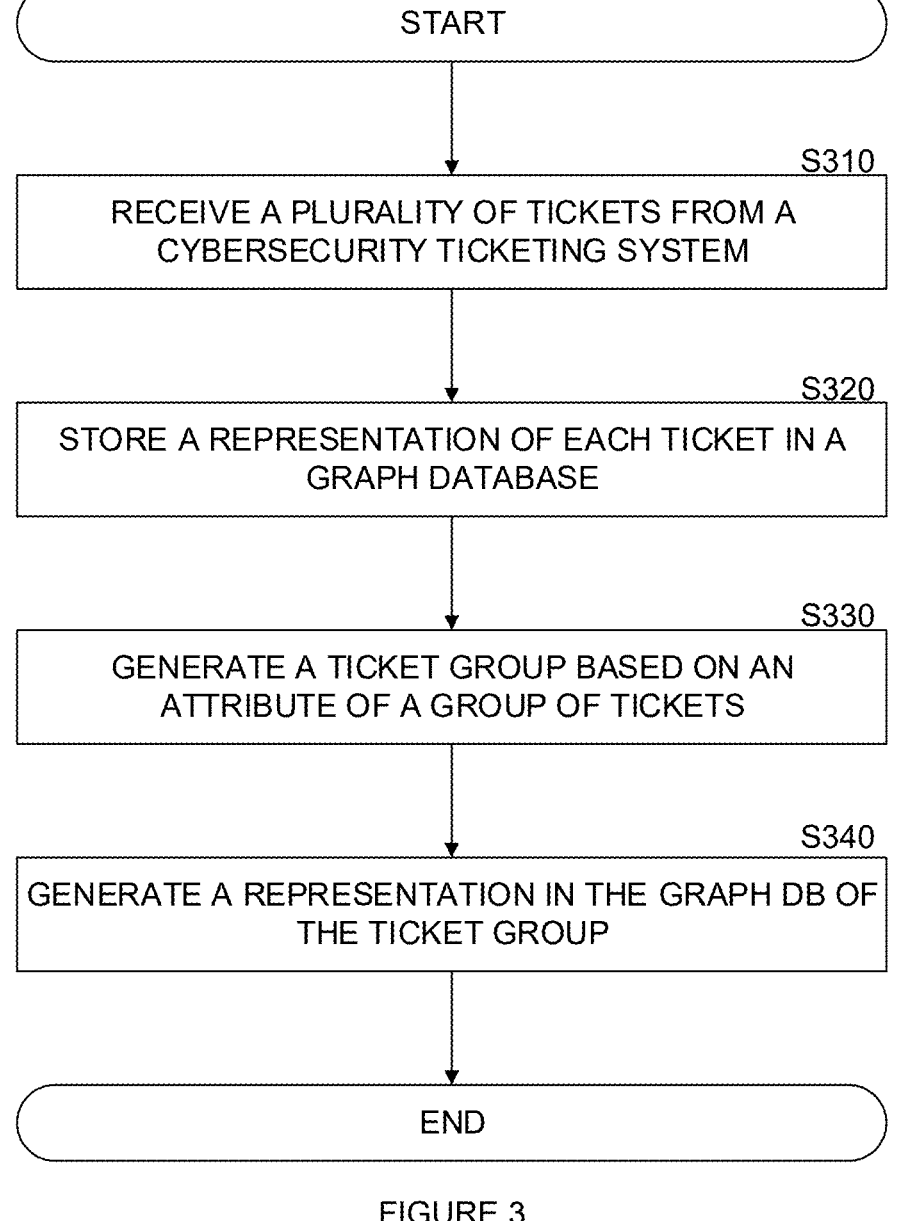
FIG. 3 is a flowchart of a method for representing tickets of a cybersecurity ticketing system, implemented in accordance with an embodiment.

FIG. 3 is an example of a flowchart 300 of a method for representing tickets of a cybersecurity ticketing system, implemented in accordance with an embodiment. A cybersecurity ticketing system is a ticketing system which generates tickets based on alerts received from cybersecurity monitoring solutions.

At S310, a plurality of tickets are received. In an embodiment, each ticket of the plurality of tickets is generated based on an alert from a cybersecurity monitoring solution. In some embodiments, a ticket is generated based on a unique alert. In certain embodiments a ticket is generated based on a plurality of unique alerts. In some embodiments, a plurality of tickets are generated based on a single alert. In an embodiment, an alert includes an identifier of a cybersecurity issue, an identifier of a resource on which the cybersecurity issue was detected, a timestamp, an identifier of a computing environment in which the resource is deployed, a combination thereof, and the like.

In certain embodiments, a ticket generated based on an alert includes an identifier of a cybersecurity issue, an identifier of a resource on which the cybersecurity issue was detected, a timestamp, an identifier of a computing environment in which the resource is deployed, a ticket status indicator, a combination thereof, and the like. In an embodiment, a ticket status indicator includes a value, such as open, resolved, closed, and the like.

At S320, a representation of each ticket of the plurality of tickets is stored in a graph database. In certain embodiments, storing a ticket in a graph database includes generating a node in the graph which represents the ticket. In an embodiment, the representation for each ticket is a node in the graph. In certain embodiments, storing the representation (i.e., node) in the graph includes storing ticket data associated with the node. For example, ticket data such as a view indicator, an identifier of a cybersecurity issue, an identifier of a resource on which the cybersecurity issue was detected, a timestamp, an identifier of a computing environment in which the resource is deployed, a ticket status indicator, a combination thereof, and the like, is stored in the graph database.

At S330, a ticket group is generated based on a shared attribute of a group of tickets. In certain embodiments, a ticket group is generated based on clustering techniques. A clustering technique is, according to an embodiment, a K-means clustering, DBSCAN clustering, Gaussian Mixture Model clustering, BIRCH clustering, spectral clustering, and the like. In an embodiment a plurality of values of an attribute are extracted from a plurality of tickets. In certain embodiments, tickets are clustered based on the extracted plurality of values. In some embodiments, a threshold is used to determine if a value of an attribute of a ticket should be clustered into a first group, a second group, and the like. For example, in an embodiment, software versions having a value between '1.1' and '2.3' are clustered into a first group, software versions having a value between '2.4' and '3.2' are clustered into a second group, etc.

In some embodiments, a ticket group is generated by applying a rule from a rule engine on a plurality of tickets. In an embodiment, a ticket group represents a group of tickets, having at least one attribute value in common. An attribute is, in an embodiment, a type of resource, an identifier of a cybersecurity issue, an identifier of an application, and the like. For example, a value of a type of resource is a virtual machine, a software container, a serverless function, and the like. A value of an attribute such as an identifier of a cybersecurity issue is, for example, a unique CVE identifier.

In an embodiment, a shared attribute is an application vulnerability of a specific application. For example, the application is Google® Chrome® web browser having any vulnerability. As another example, the shared attribute is a node of a repository, such as GitHub®. When used to group tickets, this attribute groups all tickets representing a vulnerability originating directly from the node of the repository, originating from a library to which the node has a dependency of, and the like.

At S340, a representation of the ticket group is generated in the graph database. In an embodiment, the representation for the ticket group is a group node in the graph, the group node connected to a plurality of nodes, each representing a unique ticket which comprises the ticket group. In certain embodiments, storing the representation (i.e., node) in the graph includes storing ticket data associated with the node. For example, ticket data such as a view indicator, an identifier of a cybersecurity issue, an identifier of a resource on which the cybersecurity issue was detected, a timestamp, an identifier of a computing environment in which the resource is deployed, a ticket status indicator, a combination thereof, and the like, is stored in the graph database.

In an embodiment, a view indicator receives a numerical value. For example, in an embodiment a base view (i.e., a view having the least number of tickets) includes all tickets, ticket groups, and the like, having a view value of '0'. For example, ticket group nodes, and ticket nodes not connected to a ticket group node, receive a view value of '0' in an embodiment. Ticket nodes which are connected to a ticket group node receive a value of '1'. Where a request is received to generate a view on a display with a view value of '1' or lower, are visually represented on the display.

Figure 4:
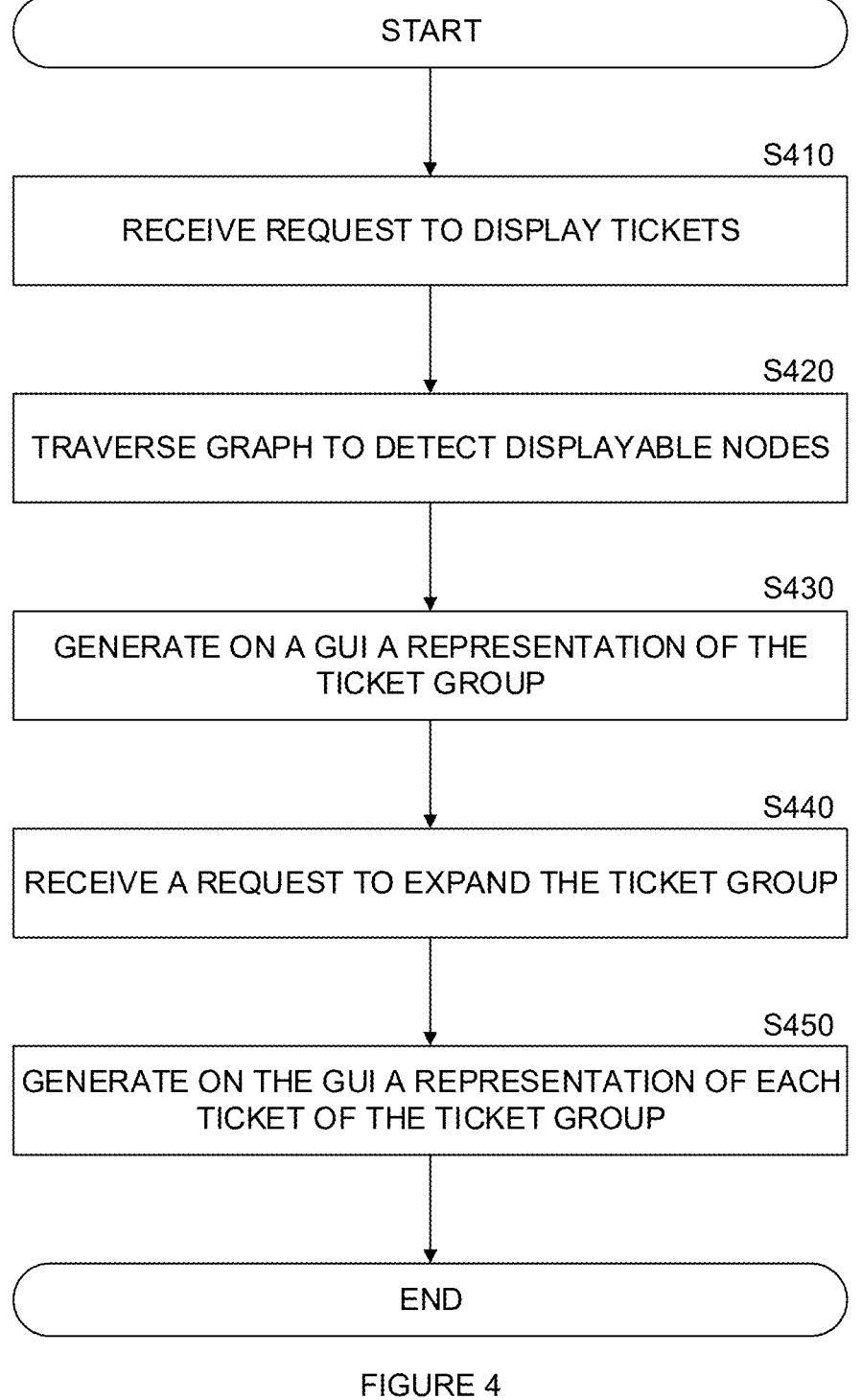
FIG. 4 is a flowchart of a method for displaying an expanded view of a reduced ticketing system, implemented in accordance with an embodiment.

FIG. 4 is an example of a flowchart 400 of a method for displaying an expanded view of a reduced ticketing system, implemented in accordance with an embodiment. In certain embodiments, it is advantageous to display an expanded view of a generated reduced view. For example, a user may wish to ascertain what tickets are grouped together. Displaying this information provides a user with a response to their query, while still keeping the initial reduced view so as not to cause alert fatigue. This improved interaction with a response management system improves efficiency by allowing a user a more convenient interaction and allows prioritizing tickets and alerts.

At S410, a request is received to display a plurality of tickets. In an embodiment, the request is received through a graphical user interface (GUI) of a response management system. In certain embodiments, the request includes a view indicator value. In some embodiments, the request includes a ticket status value. For example, the request may be to display a plurality of tickets, each having an "open" status.

At S420, a graph is traversed to detect displayable nodes. In an embodiment, a displayable node is a node representing a ticket group, a node representing a ticket which is not connected to a ticket group, a combination thereof, and the like. In certain embodiments, a displayable node is a node having a view value which is equal to a view value input received in a request to display a plurality of tickets. In some embodiments, a render is generated for a node representing a ticket group which includes a number of tickets represented by the ticket node. In an embodiment, traversing the graph includes generating a query which when executed by a database management tool on the graph database, generates a result of displayable nodes.

At S430, a GUI representation is generated based on the detected displayable nodes. In an embodiment, the GUI representation of a ticket group node is displayed on a display that can be interacted with. For example, a user may provide input, such as by clicking on, or touching a touchscreen of the display, to indicate a selection of a particular ticket group node. In an embodiment, ticket nodes, ticket group nodes, and the like, are further clustered based on similarity. For example, nodes representing tickets generated based from critical alerts are generated in one portion of a display, nodes representing tickets generated based from low level alerts are generated in a second portion of the display, and nodes representing tickets generated based from medium-level alerts are generated in a third portion of the display, between the first portion of the display and the second portion of the display.

At S440, a request is received to expand a ticket group. In an embodiment, receiving a request includes receiving an input, such as by clicking on, or touching a touchscreen of the display, to indicate a selection of a particular ticket group node. In an embodiment, in response to receiving a request to expand a ticket group, a query is generated for a graph database to retrieve ticket nodes which are connected to the ticket group node. For example, the query includes, in an embodiment, an identifier of the ticket group node.

At S450, a GUI representation is generated of a plurality of tickets of the ticket group. In an embodiment, the GUI representation is updated for a predefined period of time to display the plurality of tickets. In some embodiments, a representation of the plurality of tickets is rendered for display on the GUI for as long as an input is continuously received through the GUI. For example, while a peripheral pointing device (e.g., a mouse) transmits that a button is held down, that input is received continuously, in an embodiment.

Figure 5:
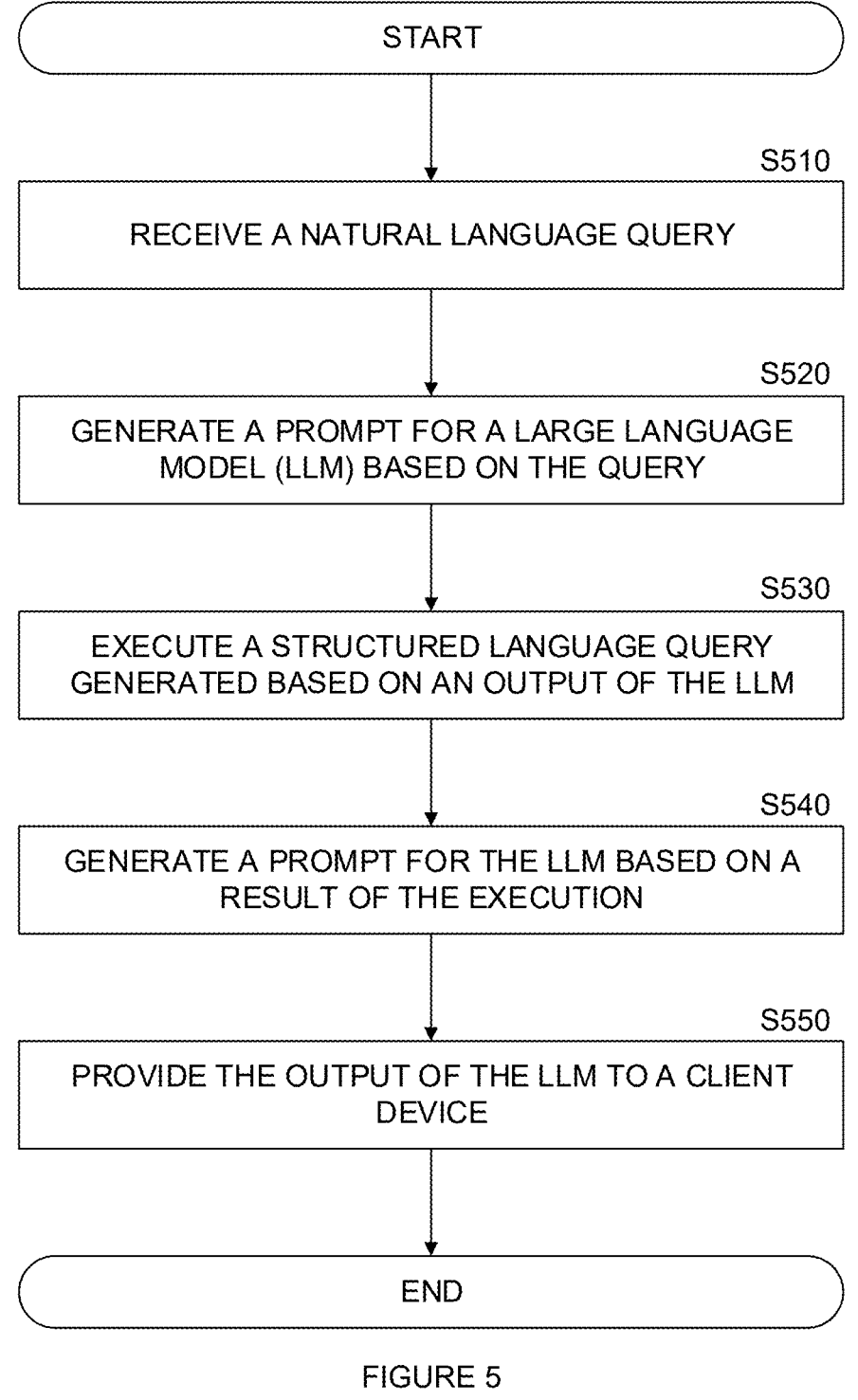
FIG. 5 is a schematic diagram of a response management system according to an embodiment.

FIG. 5 is an example flowchart of a method for utilizing a natural language interface of a response management system, implemented in accordance with an embodiment. According to an embodiment, utilizing the response management system with a natural language interface is beneficial to reduce complication of use for a human operator. For example, it is easier for a human operator to ask a question in a natural, unstructured, language, than it is for that same human to learn a structured query language, form a query, and then execute such a query.

At S510, a natural language query is received. In an embodiment, a natural language query is a query received in a natural language, such as spoken by humans. In some embodiments, a natural language is an unstructured language. In an embodiment, a natural language query is received from a user device. In certain embodiments, the natural language query is received as a string of text. In an embodiment, a natural language query is not a structured query, such as a SQL query, a computer code, a combination thereof, and the like. In certain embodiments, the natural language query includes pseudo-code, computer code, a structured query portion, a combination thereof, and the like, in addition to a query portion in a natural language.

At S520, a prompt is generated. In an embodiment, the prompt is generated for a large language model (LLM). In some embodiments, the LLM is executed on an AI engine, configured to receive the prompt. In an embodiment, the prompt is generated based on the received natural language query, a database schema, a prompt template, a structured language schema, a combination thereof, and the like.

In certain embodiments, generating a prompt based on the received natural language query, a database schema, a prompt template, a structured language schema, a combination thereof, and the like, utilizes retrieval-augmented generation which reduces the need to fine-tune the LLM.

In some embodiments, a second LLM is utilized to generate the prompt. In an embodiment, the second LLM includes a context length which is different than the context length of the LLM. In certain embodiments, the context length of the second LLM is shorter than the context length of the LLM for which the prompt is generated.

In an embodiment, the prompt, when processed utilizing the LLM, generates an output which includes a structured language query. In an embodiment, the structured language query includes a computer-executable query, such as a database query (e.g., a SQL query). In some embodiments, the structured language query includes computer-executable code.

At S530, a structured query is executed. In an embodiment, executing the structured query includes generating a structured query based on an output of an LLM. In some embodiments, the structured query is executed on a database, such as database 146 of FIG. 1 above. In an embodiment, the structured query, when executed on a database, for example by a database management system, generates an output. In some embodiment, the output is a result received from the database.

At optional S540, a second prompt is generated. In an embodiment, the second prompt is generated for the LLM, the second LLM, and the like. In some embodiments, the second prompt is generated based on the output, result, and the like, of executing the structured query.

In an embodiment, the second prompt is generated based on a template, the output, the result, a combination thereof, and the like. In some embodiments, the second prompt, when executed by an LLM configured the LLM to generate an output in natural language which includes the result of executing the structured query.

At S550, the LLM output is provided to a client device. In an embodiment, the LLM output is the output based on the second prompt. In some embodiments, the client device is a client device which provides the natural language query.

Figure 6:
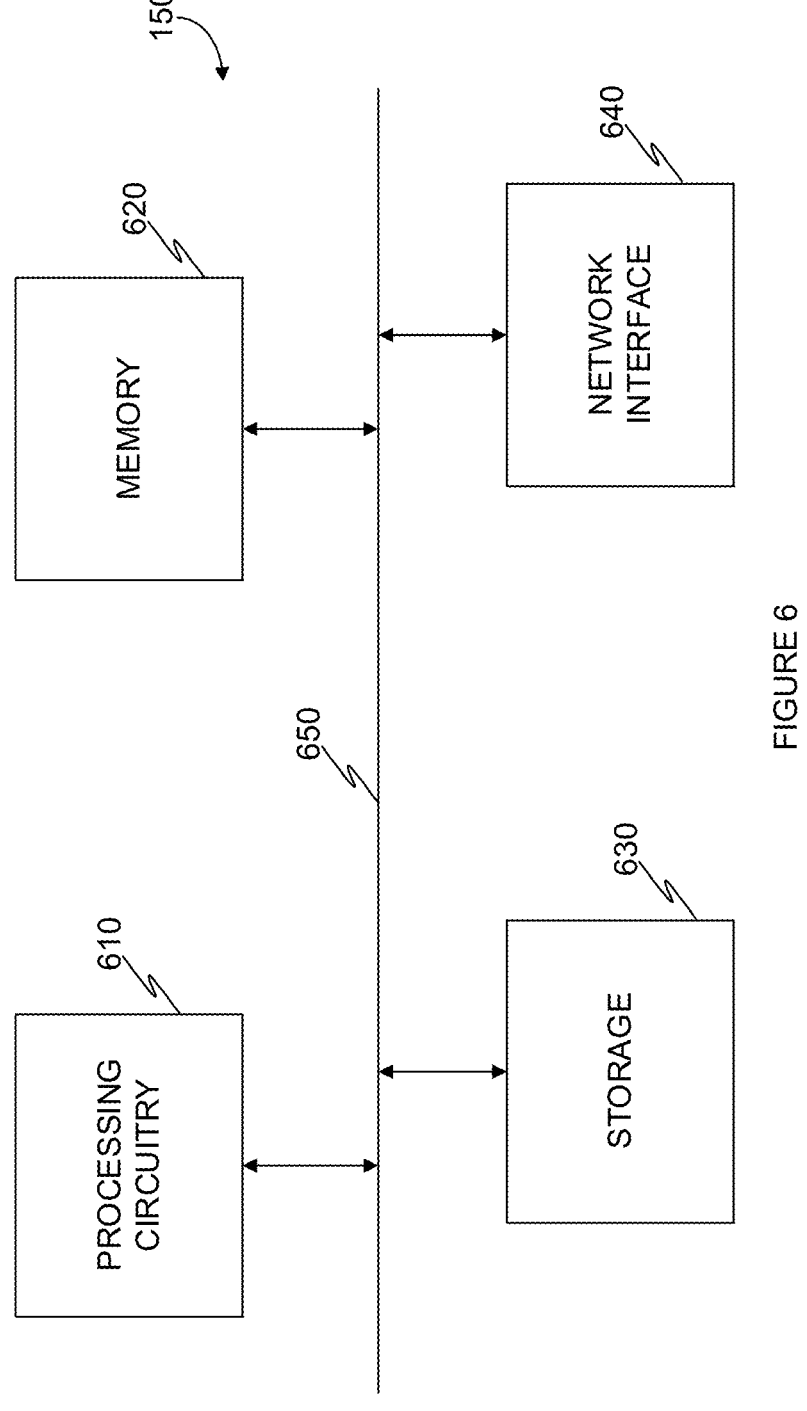
FIG. 6 is an example schematic diagram of an AI engine according to an embodiment.

FIG. 6 is an example schematic diagram of an AI engine 150 according to an embodiment. The AI engine 150 includes a processing circuitry 610 coupled to a memory 620, a storage 630, and a network interface 640. In an embodiment, the components of the AI engine 150 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the AI engine 150 to communicate with, for example, the response management system 130, the EDR system 122, the EASM system 124, graph database 146, the client device 160, a combination thereof, and the like.

It should be understood that the embodiments described herein are not limited to the specific architecture illustrated in FIG. 6, and other architectures may be equally used without departing from the scope of the disclosed embodiments.

Furthermore, in certain embodiments the response management system 130, the EDR system 122, the EASM system 124, graph database 146, the client device 160, a combination thereof, and the like, may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a natural language context from a ticket management system, comprising:
   receiving an unstructured natural language query from a client device;
   generating a first prompt for a first large language model (LLM) based on: a predefined template and the unstructured natural language query, the first prompt when processed by the first LLM outputs a structured database query;
   executing the structured database query on a database, wherein the database stores a representation of a cloud computing environment, and wherein the representation includes:
      a plurality of ticket nodes, each ticket node representing a ticket generated based on an alert; and
      at least one ticket group node representing a ticket group, wherein each ticket node belonging to the ticket group is connected in the database to the at least one ticket group node;
      wherein the database comprises a graph database in which each ticket node corresponds to an alert received from a cybersecurity monitoring system and is connected by a membership relationship to a ticket group node representing tickets sharing at least one common alert attribute;
      wherein executing the structured database query comprises querying the database to identify ticket nodes connected to a selected ticket group node;
   generating a second prompt for a second LLM based on a result of executing the structured database query, the second prompt when processed by the second LLM outputs a natural language response; and
   sending the natural language response to the client device.

2. The method of claim 1, further comprising:
   generating the first prompt further based on: the predefined template, the unstructured natural language query, and a database schema of the database.

3. The method of claim 2, further comprising:

generating the second prompt further based on: the result of executing the structured database query and the database schema of the database.

4. The method of claim 1, further comprising:

generating the representation of the cloud computing environment.

5. The method of claim 4, further comprising:

receiving a plurality of alerts from a cybersecurity monitoring system configured to monitor the cloud computing environment;

generating a plurality of tickets in a ticket management system based on the received plurality of alerts; and generating a plurality of ticket groups from the plurality of tickets, each ticket group including a subset of tickets of the plurality of tickets.

6. The method of claim 5, further comprising:

generating a node in the database representing each ticket group of the plurality of ticket groups.

7. The method of claim 6, wherein the result of executing the structured database query includes an identifier of a ticket group of the plurality of ticket groups.

8. The method of claim 1, wherein the first LLM includes a first context length, and the second LLM includes a second context length.

9. A computing environment for generating a natural language context from a ticket management system, the computing environment comprising processing circuitry configured to:

receive an unstructured natural language query from a client device;

generate a first prompt for a first large language model (LLM) based on: a predefined template and the unstructured natural language query, the first prompt when processed by the first LLM outputs a structured database query;

execute the structured database query on a database, wherein the database stores a representation of a cloud computing environment, and wherein the representation includes:

a plurality of ticket nodes, each ticket node representing a ticket generated based on an alert; and at least one ticket group node representing a ticket group, wherein each ticket node belonging to the ticket group is connected in the database to the at least one ticket group node;

wherein the database comprises a graph database in which each ticket node corresponds to an alert received from a cybersecurity monitoring system and is connected by a membership relationship to a ticket group node representing tickets sharing at least one common alert attribute;

wherein executing the structured database query comprises querying the database to identify ticket nodes connected to a selected ticket group node;

generate a second prompt for a second LLM based on a result of executing the structured database query, the second prompt when processed by the second LLM outputs a natural language response; and send the natural language response to the client device.

10. The computing environment of claim 9, wherein processing circuitry is further configured to:

generate the first prompt further based on: the predefined template, the unstructured natural language query, and a database schema of the database.

11. The computing environment of claim 10, wherein the processing circuitry is further configured to:

generate the second prompt further based on: the result of executing the structured database query and the database schema of the database.

12. The computing environment of claim 9, wherein the processing circuitry is further configured to:

generate the representation of the cloud computing environment.

13. The computing environment of claim 12, wherein the processing circuitry is further configured to:

receive a plurality of alerts from a cybersecurity monitoring system configured to monitor the cloud computing environment;

generate a plurality of tickets in a ticket management system based on the received plurality of alerts; and generate a plurality of ticket groups from the plurality of tickets, each ticket group including a subset of tickets of the plurality of tickets.

14. The computing environment of claim 13, wherein the processing circuitry is further configured to:

generate a node in the database representing each ticket group of the plurality of ticket groups.

15. The computing environment of claim 14, wherein the result of the structured database query includes an identifier of a ticket group of the plurality of ticket groups.

16. The computing environment of claim 9, wherein the first LLM includes a first context length, and the second LLM includes a second context length.

17. A non-transitory computer-readable medium for generating a natural language context from a ticket management system, the non-transitory computer-readable comprising instructions that, when executed, cause processing circuitry to execute steps of:

receiving an unstructured natural language query from a client device;

generating a first prompt for a first large language model (LLM) based on: a predefined template and the unstructured natural language query, the first prompt when processed by the first LLM outputs a structured database query;

executing the structured database query on a database, wherein the database stores a representation of a cloud computing environment, and wherein the representation includes:

a plurality of ticket nodes, each ticket node representing a ticket generated based on an alert; and at least one ticket group node representing a ticket group, wherein each ticket node belonging to the ticket group is connected in the database to the at least one ticket group node;

wherein the database comprises a graph database in which each ticket node corresponds to an alert received from a cybersecurity monitoring system and is connected by a membership relationship to a ticket group node representing tickets sharing at least one common alert attribute;

wherein executing the structured database query comprises querying the database to identify ticket nodes connected to a selected ticket group node;

generating a second prompt for a second LLM based on a result of executing the structured database query, the second prompt when processed by the second LLM outputs a natural language response; and sending the natural language response to the client device.

18. The non-transitory computer-readable medium of claim 8, wherein the steps further include:

generating the first prompt further based on: the pre-defined template, the unstructured natural language query, and a database schema of the database.

19. The method of claim 1, further comprising:

assigning a view-indicator value to each ticket node and each ticket-group node; and generating an initial visualization that renders ticket nodes and ticket-group nodes having a view-indicator value equal to a predetermined base value.

20. The method of claim 1, further comprising:

assigning a severity score to each ticket node based on a severity indicated by the alert on which the respective ticket node is generated.

\* \* \* \* \*